(12) United States Patent
Takai

(10) Patent No.: US 9,402,006 B2
(45) Date of Patent: Jul. 26, 2016

(54) DISPLAY INPUT APPARATUS, DISPLAY INPUT SYSTEM INCLUDING THE SAME, AND METHOD FOR CONTROLLING THE DISPLAY INPUT APPARATUS

(71) Applicant: KYOCERA Document Solutions Inc., Osaka (JP)

(72) Inventor: Kenji Takai, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/803,802

(22) Filed: Jul. 20, 2015

(65) Prior Publication Data

US 2016/0037006 A1 Feb. 4, 2016

(30) Foreign Application Priority Data

Jul. 31, 2014 (JP) ................................. 2014-156536

(51) Int. Cl.
*G06F 3/12* (2006.01)
*H04N 1/00* (2006.01)
*H04N 1/44* (2006.01)

(52) U.S. Cl.
CPC ....... *H04N 1/00503* (2013.01); *H04N 1/00307* (2013.01); *H04N 1/00392* (2013.01); *H04N 1/00411* (2013.01); *H04N 1/00413* (2013.01); *H04N 1/00474* (2013.01); *H04N 1/00506* (2013.01); *H04N 1/4406* (2013.01)

(58) Field of Classification Search
None
See application file for complete search history.

(56) References Cited

U.S. PATENT DOCUMENTS

| | | | | |
|---|---|---|---|---|
| 6,624,827 B1 * | 9/2003 | Hwang | ............... | H04L 12/1822 348/E7.081 |
| 7,046,134 B2 * | 5/2006 | Hansen | ................. | G06F 3/1454 340/286.02 |
| 8,274,677 B2 * | 9/2012 | Asano | ................... | G06F 3/1454 358/1.1 |
| 2012/0075653 A1 * | 3/2012 | Takai | ................... | G03G 15/502 358/1.13 |
| 2013/0132862 A1 * | 5/2013 | Noel | ..................... | G06F 3/0481 715/753 |
| 2014/0025744 A1 * | 1/2014 | Kim | ..................... | G06F 3/1454 709/204 |
| 2014/0240769 A1 * | 8/2014 | Tanji | .................. | H04N 1/00307 358/1.15 |
| 2015/0109640 A1 * | 4/2015 | Amano | ................ | G06F 3/1292 358/1.15 |
| 2015/0339090 A1 * | 11/2015 | Lee | ......................... | G06F 3/14 345/173 |

FOREIGN PATENT DOCUMENTS

JP 2009-146198 A 7/2009

* cited by examiner

*Primary Examiner* — Dung Tran
(74) *Attorney, Agent, or Firm* — Stein IP, LLC

(57) ABSTRACT

A display input apparatus according to a first aspect of the present disclosure includes a display portion, a touch panel portion, and a communication portion. The display portion displays a setting screen which disposes a plurality of images for accepting a setting operation. The touch panel accepts the setting operation on the setting screen and when accepting the setting operation, accepts a selection operation as well for selecting a non-permission image from the plurality of images that is an image not permitted to be displayed on a partner machine which is a communication destination. The communication portion transmits screen data for forcing the partner machine to display a screen to the partner machine, in which the non-permission image is removed from the setting screen, as a sharing screen and forces the partner machine to display the sharing screen.

7 Claims, 9 Drawing Sheets

DISPLAY INPUT APPARATUS, DISPLAY INPUT SYSTEM INCLUDING THE SAME, AND METHOD FOR CONTROLLING THE DISPLAY INPUT APPARATUS

INCORPORATION BY REFERENCE

The present application is based on Japanese Patent Application No. 2014-156536 filed on Jul. 31, 2014, the contents of which are hereby incorporated by reference.

BACKGROUND

The present disclosure relates to: a display input apparatus that displays a setting screen which disposes a plurality of setting images; a display input system that includes the display input apparatus; and a method for controlling the display input apparatus.

There are some display input apparatuses such as a smart phone, a tablet and the like that can force a partner machine at a communication destination to display a setting screen in current display. According to such a display input apparatus, a user of the own machine at a communication transmission end can ask a user of the partner machine to confirm a setting screen in current display without visiting the partner machine user. However, the setting screen disposes a plurality of images (e.g., a software key, an icon, a text image and the like), and there is a case where a user does not want the partner machine user to see a predetermined image of the plurality of images or a case where the user does not want the partner machine user to operate the predetermined image of the plurality of images.

Here, conventionally, an information management system is known in which when a request for checking work information is sent from a user client to a server, the user client is forced to display a work information checking screen. In this information management system, information (table), which indicates whether checking is permitted or not, is stored for each of a plurality of items (name, sex and the like) contained in the work information. And, the user client is forced to display a work information checking screen in which an item of the plurality of items not permitted to be checked is not displayed (blacked).

SUMMARY

A display input apparatus according to a first aspect of the present disclosure includes a display portion, a touch panel portion, and a communication portion. The display portion displays a setting screen which disposes a plurality of images for accepting a setting operation. The touch panel accepts the setting operation on the setting screen and when accepting the setting operation, accepts a selection operation as well for selecting a non-permission image that is an image not permitted to be displayed on a partner machine which is a communication destination. The communication portion transmits screen data for forcing the partner machine to display a screen, in which the non-permission image is removed from the setting screen, as a sharing screen and forces the partner machine to display the sharing screen.

A display input system according to a second aspect of the present disclosure includes the above display input apparatus and a partner machine that is a communication destination for the display input apparatus. When the partner machine receives the screen data from the display input apparatus, the partner machine displays the sharing screen.

A method for controlling the display input apparatus according to a third aspect of the present disclosure includes: a step for displaying a setting screen which disposes a plurality of images for accepting a setting operation; a step for accepting the setting operation on the setting screen and when accepting the setting operation, accepting a selection operation as well for selecting a non-permission image that is an image not permitted to be displayed on a partner machine which is a communication destination; and a step for transmitting screen data for forcing the partner machine to display a screen, in which the non-permission image is removed from the setting screen, as a sharing screen and forcing the partner machine to display the sharing screen.

DETAILED DESCRIPTION

A display input apparatus according to an embodiment of the present disclosure is described by using a mobile information terminal such as a smart phone, a tablet and the like as an example.

<Overview of Display Input System>

Figure 1:
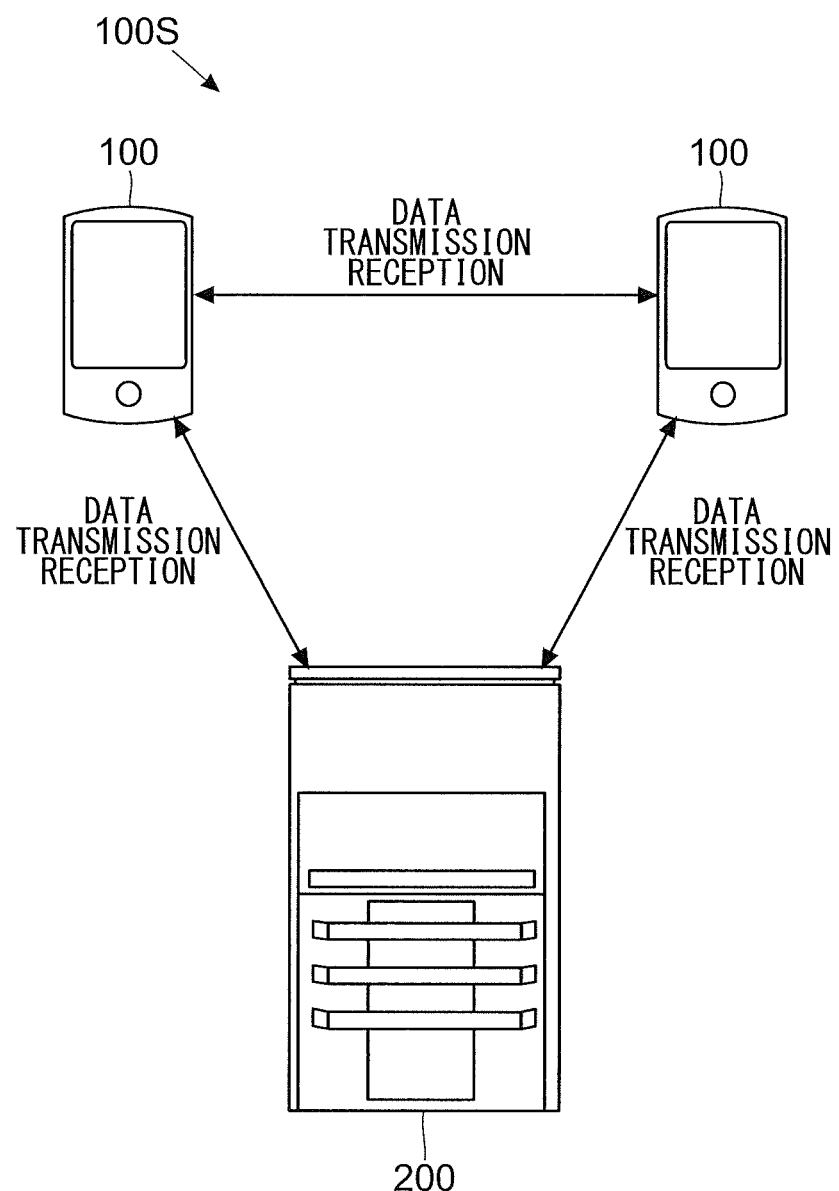
FIG. 1 is a schematic view of a mobile information terminal according to an embodiment of the present disclosure and a display input system that includes the terminal.

As shown in FIG. 1, a display input system 100S according to the present embodiment includes a plurality of mobile information terminals 100 (corresponding to a "display input apparatus"). Each mobile information terminal 100 can perform transmission/reception of various data with another mobile information terminal 100. Besides, each mobile information terminal 100 can also perform transmission/reception of various data with an image forming apparatus 200. In the meantime, each device of the display input system 100S performs transmission/reception of various data by means of internet communication, short-distance wireless communication and the like.

For example, the mobile information terminal 100 displays setting screens S (see FIG. 4 and FIG. 5) for performing setting of the image forming apparatus 200, and accepts setting of the image forming apparatus 200 from a user. Besides, the mobile information terminal 100 is commanded by a user to transmit setting data, which indicate content (a setting item for which a setting value is set, the setting value and the like) set on the setting screen S, to the image forming apparatus 200. And, in the image forming apparatus 200, when the setting data are received from the mobile information terminal 100, the setting content is changed based on the setting data. In this way, even if the user does not perform a direct operation on the image forming apparatus 200, the setting content of the image forming apparatus 200 is changed to the setting content desired by the user. In the meantime, the setting screen S is described in detail later.

Here, the respective structures of the plurality of mobile information terminals 100 constituting the display input system 100S may be identical to or different from one another. In the following description, as an example, it is assumed that the respective structures of the plurality of mobile information terminals 100 are identical to one another.

<Overview of Mobile Information Terminal>

Figure 2:
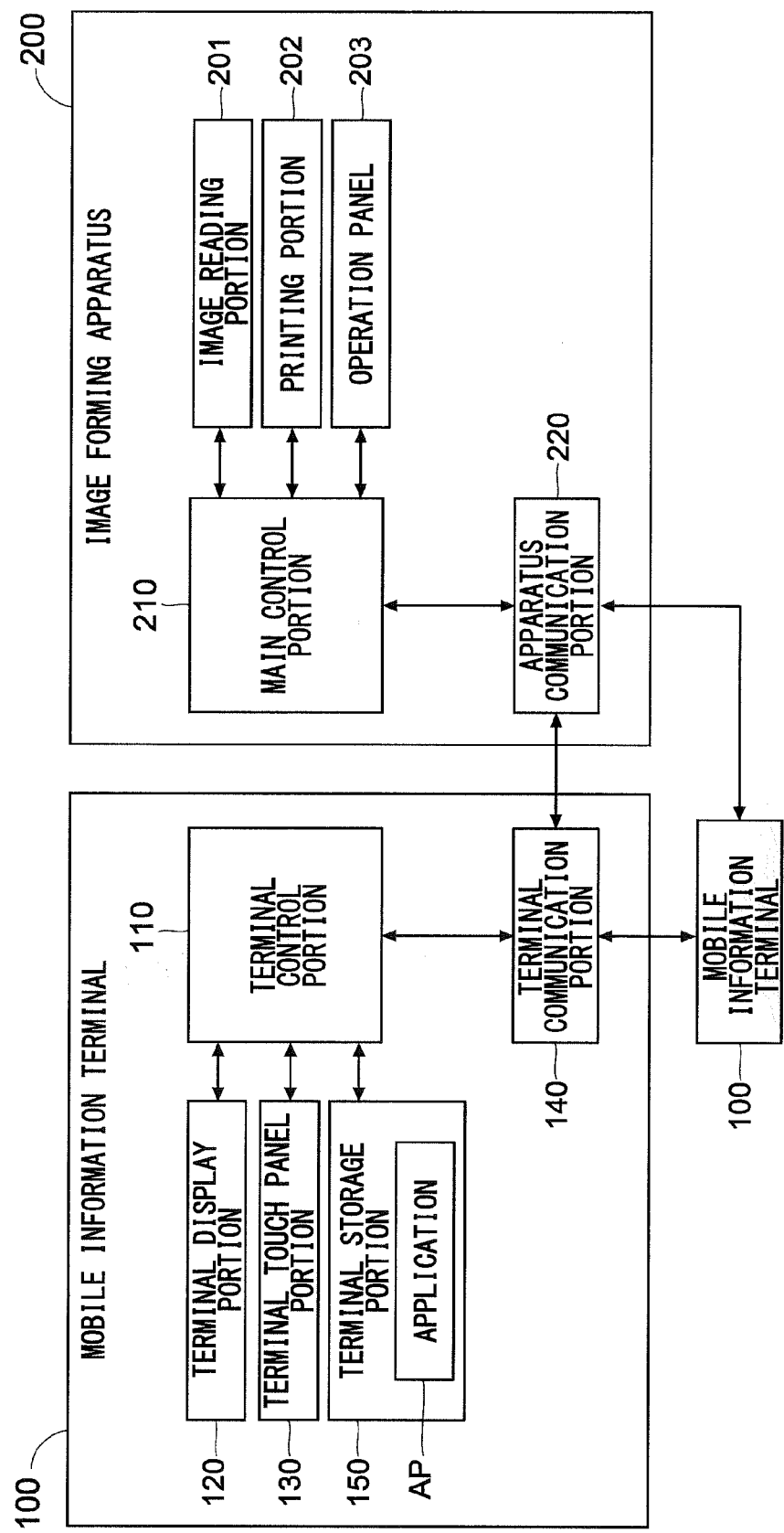
FIG. 2 is a view showing an example of hardware structures of a mobile information terminal according to an embodiment of the present disclosure and an image forming apparatus that communicates with the terminal.

As shown in FIG. 2, the mobile information terminal 100 includes a terminal control portion 110, a terminal display portion 120, a terminal touch panel portion 130, a terminal communication portion 140 and a terminal storage portion 150. The terminal display portion 120 corresponds to a "display portion," the terminal touch panel portion 130 corresponds to a "touch panel portion," and the terminal communication portion 140 corresponds to a "communication portion."

The terminal control portion 110 performs whole control of the mobile information terminal 100. The terminal display portion 120 displays various screens such as the setting screens S (see FIG. 4 and FIG. 5) and the like. In the meantime, various images (e.g., a software key, an icon, a text image and the like) are displayed on a screen displayed by the terminal display portion 120. The terminal touch panel portion 130 accepts a touch operation on a display screen of the terminal display portion 120.

The terminal display portion 120 and the terminal touch panel portion 130 are controlled by the terminal control portion 110. For example, the terminal control portion 110 controls a display operation of the terminal display portion 120. Besides, based on output from the terminal touch panel portion 130, the terminal control portion 110 detects a touch operation on the display screen of the terminal display portion 120 (e.g., locates a software key on which the touch operation is performed).

The terminal communication portion 140 is controlled by the terminal control portion 110 to perform internet communication, short-distance wireless communication and the like. For example, the terminal communication portion 140 transmits/receives various data with an external device (another mobile information terminal 100 and the image forming apparatus 200). The terminal storage portion 150 stores a program and data for controlling the mobile information terminal 100. For example, as the control program and data, an application AP for performing the setting of the image forming apparatus 200 is stored in the terminal storage portion 150.

The application AP is downloaded from an external server (not shown) by means of the internet communication performed by the terminal communication portion 140 and stored into the terminal storage portion 150. When the application AP is stored into the terminal storage portion 150, the terminal control portion 110 forces the terminal display portion 120 to perform display of an application icon (not shown) for starting up the application AP. And, upon detecting a touch operation on the application icon based on the output from the terminal touch panel portion 130, the terminal control portion 110 performs a process for starting up the application AP. In this way, the setting screens S (see FIG. 4 and FIG. 5) are displayed on the mobile information terminal 100, so that it becomes possible to perform the setting of the image forming apparatus 200 by using the mobile information terminal 100.

<Structure of Image Forming Apparatus>

Figure 3:
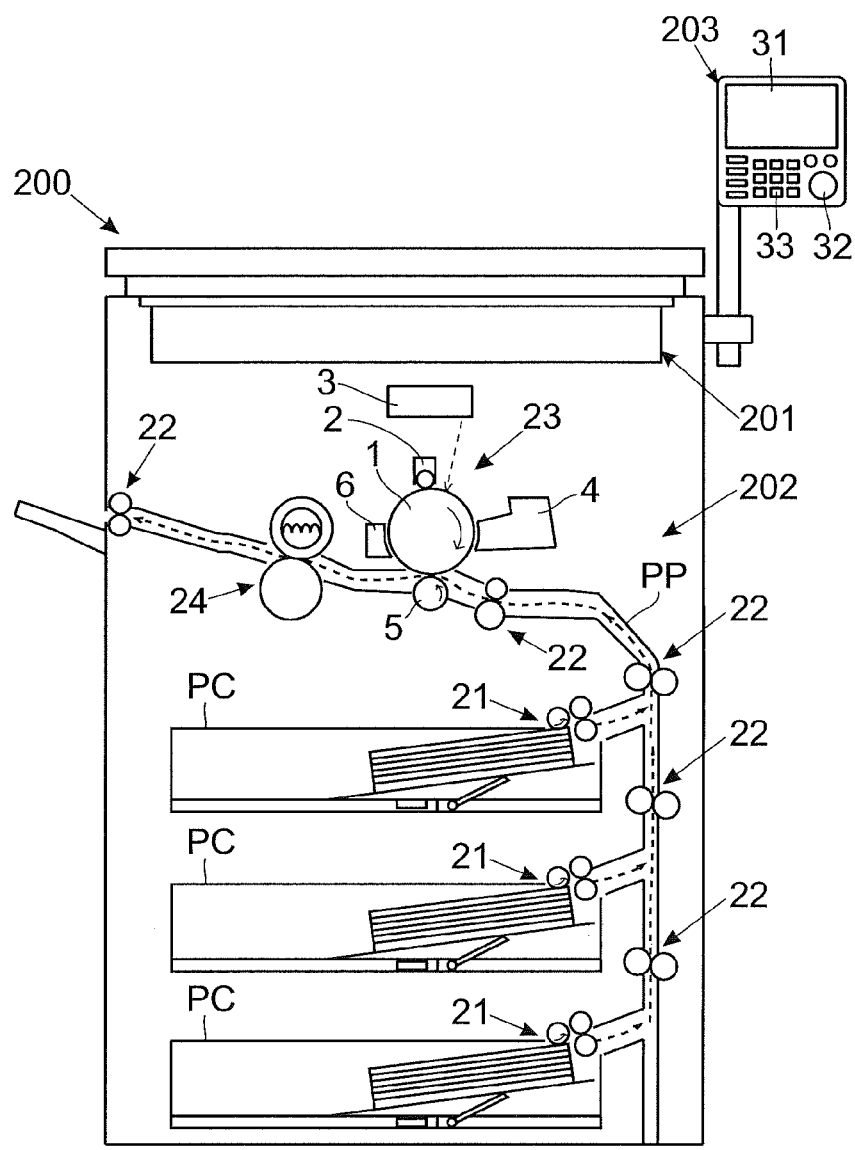
FIG. 3 is a schematic view of an image forming apparatus that communicates with a mobile information terminal according to an embodiment of the present disclosure.

The image forming apparatus 200 is a multi-function machine that incorporates a plurality of kinds of functions such as a copy function, a fax function and the like. As shown in FIG. 3, the image forming apparatus 200 includes an image reading portion 201, a printing portion 202, and an operation panel 203.

The image reading portion 201 reads a document to generate image data of the document. For example, various image processes are applied by a later-described main control portion 210 to the image data of the document obtained by the reading of the image reading portion 201. And, the image data become basic data of facsimile data. Or, the image data become basic data of the image printed by the printing portion 202.

The printing portion 202 is composed of a sheet feeding portion 21, a sheet conveyance portion 22, an image forming portion 23, and a fixing portion 24. The sheet feeding portion 21 supplies a sheet stored in a sheet cassette PC to a sheet conveyance path PP. The sheet conveyance portion 22 conveys the sheet along the sheet conveyance path PP. The image forming portion 23 includes a photosensitive drum 1, a charging device 2, a light exposure device 3, a developing device 4, a transfer roller 5, and a cleaning device 6. And, the image forming portion 23 forms a toner image based on the image data, and transfers the toner image onto the sheet. The fixing portion 24 heats and presses the toner image transferred to the sheet to fix the toner image.

The operation panel 203 includes a display panel 31 having a touch panel. The display panel 31 displays a software key and a message for accepting various settings. Besides, the operation panel 203 is provided with hardware keys such as a start key 32, a ten-key pad 33 and the like. In the meantime, it is also possible to perform the setting of the image forming apparatus 200 by means of an operation on the operation panel 203.

Besides, as shown in FIG. 2, the image forming apparatus 200 includes the main control portion 210. The main control portion 210 applies various image processes (enlargement/reduction, concentration change, data format conversion, and the like) to image data and controls a reading operation of the image reading portion 201 and a printing operation of the printing portion 202.

Besides, the image forming apparatus 200 includes an apparatus communication portion 220. The apparatus communication portion 220 is connected to an external device (the mobile information terminal 100 and the like) for communication. And, the apparatus communication portion 220 is controlled by the main control portion 210 to perform transmission/reception of various data with the external device. For example, the apparatus communication portion 220 receives setting data indicating setting content of the image forming apparatus 200 from the mobile information terminal 100. And, when the apparatus communication portion 220 receives the setting data, the main control portion 110 changes the setting content of the image forming apparatus 200 based on the setting data.

<Setting Screen Relevant to Image Forming Apparatus>

Figure 4:
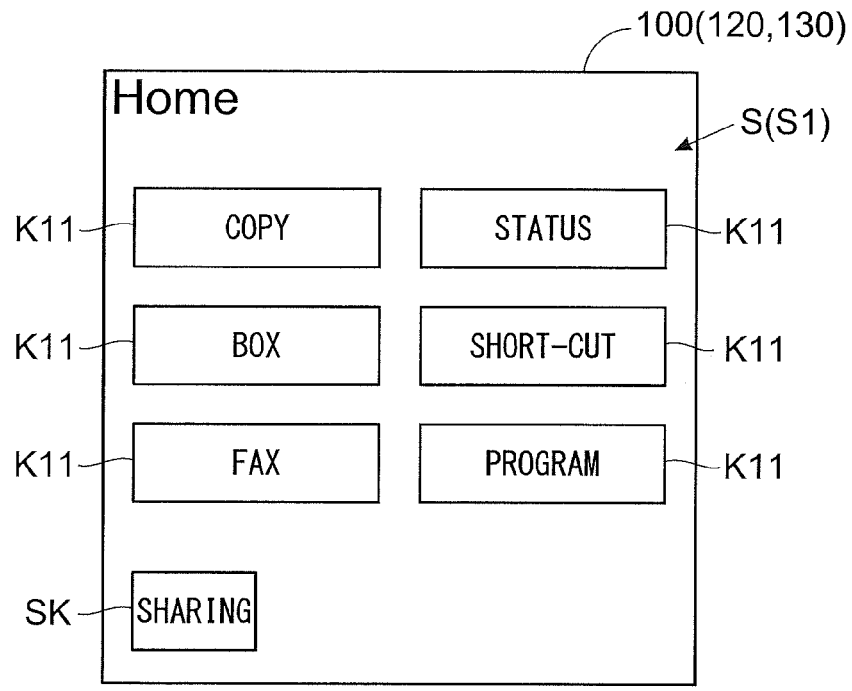
FIG. 4 is a view showing an example of a setting screen (home screen) that is displayed on a mobile information terminal according to an embodiment of the present disclosure.

The mobile information terminal 100 displays a home screen (initial screen) S1 shown in FIG. 4 as a setting screen S by means of the startup of the application AP. The home screen S1 is a screen that is one of the setting screens S relevant to the image forming apparatus 200 and located on the uppermost layer.

The home screen S1 disposes a plurality of function keys K11 (corresponding to an "image"). The function key K11 is a key for selecting, from the plurality of setting screens S located on one more downward layer than the home screen S1, the setting screen S to be displayed after the home screen S1. For example, when a copy key of the plurality of function keys K11 is touched, a setting item screen S2 (see FIG. 5) is displayed which is the setting screen S located on the one more downward layer than the home screen S1 and used to set the copy function.

In the meantime, it is possible to arbitrarily change the number and kind of function keys K11 disposed on the home screen S1. As an example, FIG. 4 shows the home screen S1 that besides the copy key, disposes a box key, a fax key, a status key, a short-cut key, and a program key as the function keys K11. And, in a case where the function key K11 other than the copy key of the plurality of function keys K11 is touched, although not shown, a screen corresponding to the function key K11 targeted for the touch operation is displayed as the setting screen S.

For example, in a case where the fax key is touched, a screen for performing the setting (setting of a fax communication destination and the like) of the fax function is displayed as the setting screen S. In a case where the box key is touched, a screen for performing the setting of the box function is displayed as the setting screen S. In the meantime, the box function is a function of storing image data obtained by the reading of a document by the image reading portion 201 and forcing the printing portion 202 to perform printing based on the stored image data. In the meantime, on the screen for performing the setting of the box function, it is possible to perform selection and the like of a box (saving region registered in advance) to be used.

Besides, in a case where the status key is touched, a screen, which shows specifications and various states of the image forming apparatus 200 such as an apparatus status, a state of communication with the image forming apparatus 200 and the like, is displayed as the setting screen S. In a case where the short-cut key is touched, a screen corresponding to the short-cut key in advance is displayed as the setting screen S. In a case where the program key is touched, a screen, which is used to perform setting of the program function and selection of the program registered in advance, is displayed as the setting screen S. In the meantime, the program function is a function of registering one or more setting items (setting values), as a program, selected from a plurality of setting items relevant to the copy function and fax function.

Figure 5:
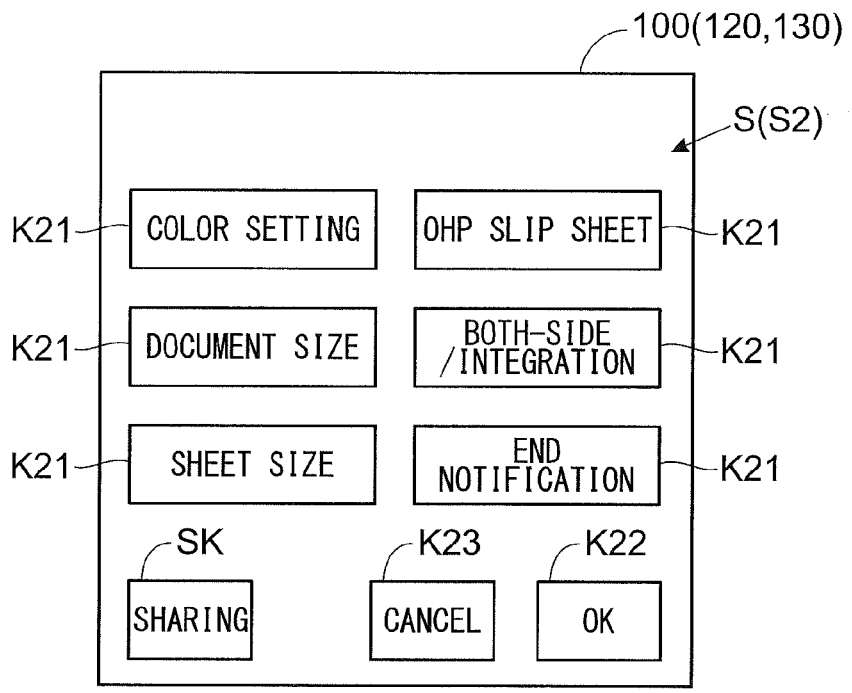
FIG. 5 is a view showing an example of a setting screen (setting item screen) that is displayed on a mobile information terminal according to an embodiment of the present disclosure.

As shown in FIG. 5, the setting item screen S2 for the copy function disposes a plurality of setting item keys K21 (corresponding to an "image") that correspond respectively to the plurality of setting items relevant to the copy function. As an example, FIG. 5 shows the setting item screen S2 that disposes the plurality of setting item keys K21 which correspond to respective setting items such as color setting, a document size, a sheet size, an OHP slip sheet, both-side/integration, and a job end notification. When a key of the plurality of setting item keys K21 is touched on the setting item screen S2, a setting value screen (not shown) corresponding to the setting key K21 targeted for the touch operation is displayed as the setting screen S.

The setting value screen is a screen for inputting a setting value of a corresponding setting item. According to this, it is possible to change the respective setting values of the plurality of setting items relevant to the copy function to desired values. When a change of a setting value on the setting value screen is decided, the display screen returns from the setting value screen to the setting item screen S2.

Thereafter, for example, when an OK key K22 disposed on the setting item screen S2 is touched, setting data indicating content set on the setting value screen (downward layer screen of the setting item screen S2) are transmitted from the mobile information terminal 100 to the image forming apparatus 200. In this way, in the image forming apparatus 200 that receives the setting data from the mobile information terminal 100, a change of the setting content is performed based on the setting data.

In the meantime, the setting item screen S2 disposes a cancel key K23. In a case where the cancel key K23 is touched, for example, content set on the setting value screen (not shown), which is the downward layer screen of the setting item screen S2, is cancelled. At this time, the display screen may be switched from the setting item screen S2 to the home screen S1.

<Sharing of Display Screen>

Figure 6:
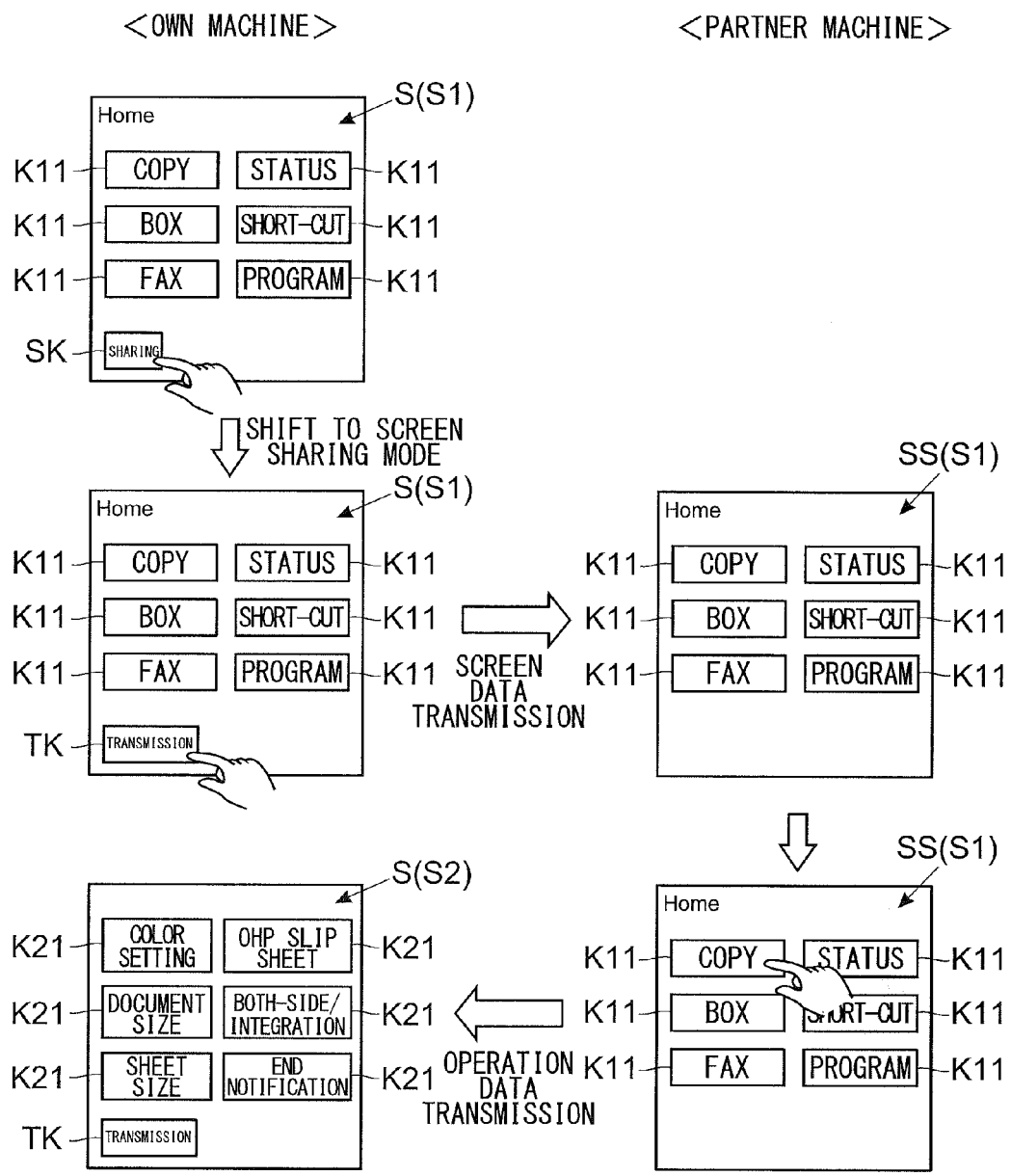
FIG. 6 is a view for describing a display operation which a mobile information terminal according to an embodiment of the present disclosure performs during a screen sharing mode time.

The mobile information terminal 100 is structured to be capable of forcing the partner machine (another mobile information terminal 100) at the communication destination to display the setting careen S being displayed on the own machine. For example, as shown in FIG. 4 and FIG. 5, the setting screen S disposes a sharing key SK. And, when the sharing key SK is touched, a shift to a screen sharing mode is performed. Hereinafter, with reference to FIG. 6, the home screen S1 and the setting item screen S2 are described specifically as examples.

When accepting a setting operation on the home screen S1 (during display of the home screen S1), upon detecting a touch operation on the sharing key SK, the terminal control portion 110 on the own machine side shifts to the screen sharing mode. Or, the terminal control portion 110 may shift to the screen sharing mode by using an event, where a touch gesture (operation different from the operation of touching the sharing key SK) predetermined as an operation for shifting to the screen sharing mode is performed, as a trigger. In this case, the sharing key SK may not be disposed in the screen.

In the meantime, to shift to the screen sharing mode, the application AP (see FIG. 2) needs to be started up on the partner machine. Because of this, at a time of shifting to the screen sharing mode, the home screen (not shown) is displayed even on the partner machine.

Upon shifting to the screen sharing mode, the terminal control portion 110 on the own machine side instructs the terminal display portion 120 to display a transmission key TK in the home screen S1. And, based on the output from the terminal touch panel portion 130, upon detecting a touch operation on the transmission key TK, the terminal control portion 110 on the own machine side instructs the terminal communication portion 140 to transmit screen data, which are for displaying the home screen S1 as the sharing screen SS on the partner machine identical to the home screen S1 being displayed on the own machine, to the partner machine. In the meantime, the screen data may be transmitted to the partner machine by using an event, where a touch gesture (operation different from the operation of touching the transmitting key TK) predetermined as an operation for transmitting the screen data to the partner machine is performed, as a trigger. In this case, the sharing key SK may not be disposed in the screen.

When the partner machine receives the screen data, the home screen S1 identical to the home screen S1 being displayed on the own machine is displayed as the sharing screen SS on the partner machine. In other words, the sharing screen SS disposes all of the plurality of selection keys K11. And, when a touch operation (operation of touching any one of the plurality of selection keys K11) is performed on the sharing screen SS at the partner machine, operation data indicating content of the operation on the sharing screen SS of the partner machine are transmitted from the partner machine to the own machine. In the meantime, the operation data define what kind of touch operation is performed on the sharing screen SS at the partner machine (on which one of the plurality of selection keys K11 the touch operation is performed).

When the terminal communication portion 140 receives the operation data from the partner machine, the terminal control portion 110 on the own machine side forces the terminal display portion 120 to perform a display switchover to a screen to be displayed in a case where an operation identical to the touch operation on the sharing screen SS of the partner machine is performed on the home screen S1. For example, it is assumed that a touch operation is performed on the copy key of the plurality of function keys K11 at the partner machine. In this case, the terminal control portion 110 on the own machine side instructs the terminal display portion 120 to display the setting item screen S2 for performing the setting of the copy function.

As described above, upon shifting to the screen sharing mode, the screen identical to the setting screen S being displayed on the own machine is displayed as the sharing screen SS on the partner machine. And, when a touch operation is performed on the sharing screen SS at the partner machine, the setting screen S in current display on the own machine is switched to a screen to be displayed in a case where an operation identical to the touch operation performed on the partner machine is performed. In this way, even if the user does not know what kind of operation to perform to fulfill the setting of the image forming apparatus 200, it is possible to ask the partner machine user to indicate an operation procedure, which is convenient.

<Selection of Non-Permission Key>

Upon shifting to the screen sharing mode, the setting screen S being displayed on the own machine is displayed on the partner machine as well. However, there is a case where some users do not want the partner machine user to see or operate a predetermined key of the plurality of software keys disposed on the setting screen S.

Accordingly, in the present embodiment, a key, which is one of the plurality of software keys disposed on the setting screen S and selected by the user, is not displayed on the partner machine. Hereinafter, with reference to FIG. 7 and FIG. 8, the home screen S1 and the setting item screen S2 are described specifically as examples.

First, upon detecting an operation (operation of touching the sharing key SK in the home screen S1) for shifting to the screen sharing mode, the terminal control portion 110 on the own machine side shifts to the screen sharing mode.

Upon shifting to the screen sharing mode, the terminal control portion 110 on the own machine side forces the terminal touch panel portion 130 to perform acceptance of a selection operation of selecting, from the plurality of function keys K11, the function key K11 not permitted to be displayed on the partner machine. Because of the selection operation, a software key selected as the function key K11 not permitted to be displayed on the partner machine corresponds to a "non-permission image." In the following description, there is a case where the function key K11 not permitted to be displayed on the partner machine is called a "non-permission key K11" and the function key K11 (software key not selected as the non-permission key K11) permitted to be displayed on the partner machine is called a "permission key K11." In the meantime, the selection operation is described in detail later.

Figure 7:
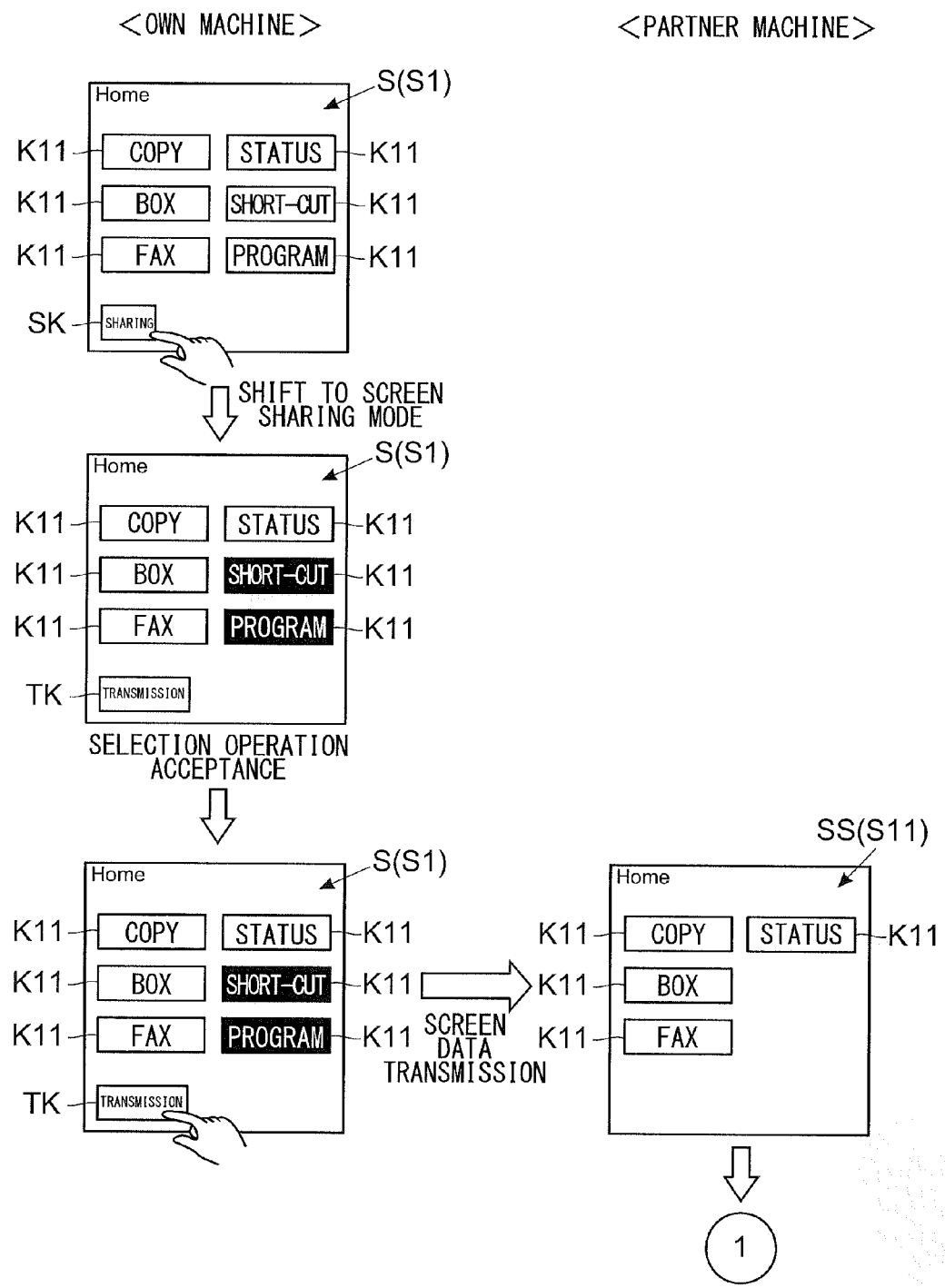
FIG. 7 is a view (view in a case where a selection operation for selecting a non-permission key is performed) for describing a display operation which a mobile information terminal according to an embodiment of the present disclosure performs during a screen sharing mode time.
Figure 8:
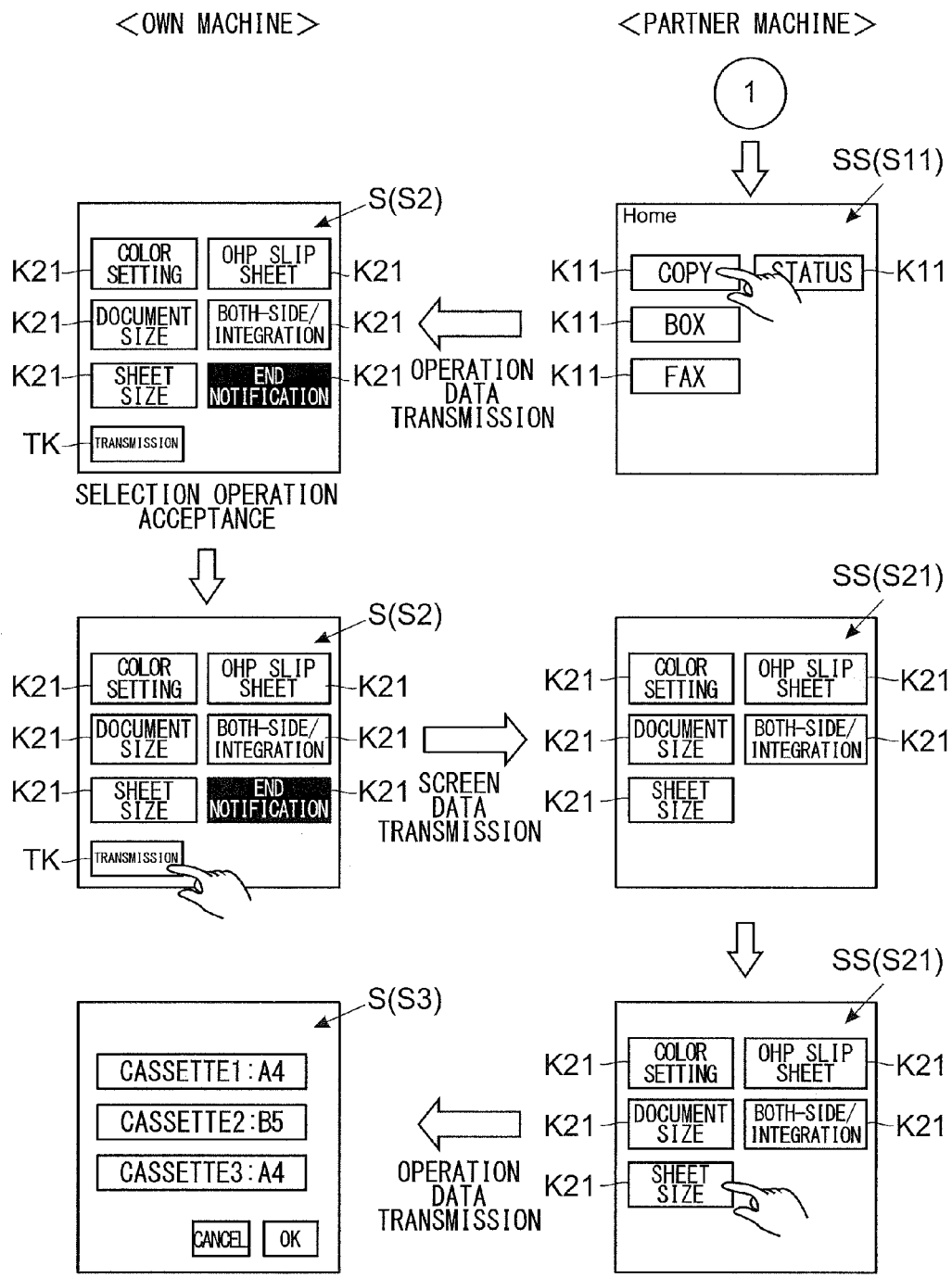
FIG. 8 is a view (continued from FIG. 7) for describing a display operation which a mobile information terminal according to an embodiment of the present disclosure performs during a screen sharing mode time.

For example, to facilitate distinguishing the non-permission key K11 and the permission key K11 from each other, the terminal control portion 110 on the own machine side instructs the terminal display portion 120 to change a display form (e.g., display color and the like) of the non-permission key K11. Or, the non-permission key K11 may not be displayed or enclosed by a frame. FIG. 7 shows an example in which of the plurality of selection keys K11, the short-cut key and the program key are selected as the non-permission keys K11 and the display colors of these non-permission keys K11 are reversed in black and white.

On the own machine side, when the non-permission key K11 is decided, an operation (e.g., operation of touching the transmission key TK in the home screen S1) for transmitting the screen data to the partner machine is performed. Upon detecting this operation, the terminal control portion 110 on the own machine side forces the terminal communication portion 120 to perform the transmitting of the screen data to the partner machine. At this time, the screen data transmitted from the own machine to the partner machine are data for forcing the partner machine to display a screen S11, in which the non-permission key K11 is removed from the home screen S1 being displayed on the own machine, as the sharing screen SS. Besides, the screen data transmitted from the own machine to the partner machine do not contain data for displaying a downward layer screen of the home screen S1 being displayed on the own machine at the time of accepting the selection operation.

When the partner machine receives the screen data, the screen S11, in which the non-permission key K11 is removed from the home screen S1 being displayed on the own machine, is displayed as the sharing screen SS on the partner machine. In other words, the sharing screen SS (S11) disposes only the permission key K11 of the plurality of function keys K11 and does not dispose the non-permission key K11. Here, the short-cut key and the program key are designated as the non-permission keys K11. Accordingly, the sharing screen SS (S11) does not dispose the short-cut key and program key of the plurality of function keys K11.

Thereafter, a touch operation (operation of touching any one of the plurality of selection keys K11) is performed on the sharing screen SS (S11) at the partner machine. As an example, it is assumed that a touch operation is performed on the copy key of the plurality of selection keys K11 at the partner machine.

When a touch operation is performed on the sharing screen SS (S11) at the partner machine, operation data indicating content of the operation on the sharing screen SS (S11) of the partner machine are transmitted from the partner machine to the own machine. Here, the screen data received by the partner machine do not contain data for displaying a downward layer screen of the home screen S1 being displayed on the own machine at the time of accepting the selection operation. Accordingly, even if a touch operation is performed on the sharing screen SS (S11) at the partner machine, the display screen of the partner machine still stays at the sharing screen SS (S11) and the display screen is not switched.

When the terminal communication portion 140 receives the operation data from the partner machine, the terminal control portion 110 on the own machine side forces the terminal display portion 120 to perform a display switchover to a screen to be displayed in a case where an operation identical to the touch operation on the sharing screen SS (S11) of the partner machine is performed on the home screen S1. Here, a touch operation is performed on the copy key of the plurality of function keys K11 at the partner machine; accordingly, the terminal control portion 110 on the own machine side forces the terminal display portion 120 to perform the display of the setting item screen S2 corresponding to the copy key.

Here, like the home screen S1 located on the uppermost layer, the setting item screen S2 located on a downward layer of the home screen S1 can also be continuously shared with the partner machine. In other words, the terminal control portion 110 in the own machine side forces the terminal display portion 120 to perform the display of the setting item screen S2 based on operation data from the partner machine, thereafter, forces again the terminal touch panel portion 130 to perform the acceptance of a selection operation.

The control after this is the same as the control when the display of the home screen S1 is shared with the partner machine. Specifically, the terminal control portion 110 on the own machine side detects a selection operation based on the output from the terminal touch panel portion 130, and recognizes the setting item key K21 (there is a case of being called a non-permission key K21) that is one of the plurality of setting item keys K21 and is not permitted to be displayed on the partner machine. In other words, the terminal control portion 110 on the own machine side recognizes the setting item key K21 (hereinafter, there is a case of being called a permission key K21) that is not selected as the non-permission key K21. Besides, the terminal control portion 110 on the own machine side instructs the terminal communication portion 140 to transmit screen data for displaying a screen S21, in which the non-permission key K21 is removed from the setting item screen S2 being displayed on the own machine, as the sharing screen SS to the partner machine.

Thereafter, when a touch operation is performed on the sharing screen SS (S21) at the partner machine and the terminal control portion 110 on the own machine side receives operation data (data indicating content of the operation on the sharing screen SS (S21) of the partner machine) transmitted from the partner machine because of the touch operation, the terminal control portion 110 on the own machine side forces the terminal display portion 120 to perform a display switchover to a screen to be displayed in a case where an operation identical to the touch operation on the sharing screen SS of the partner machine is performed on the setting item screen S2. For example, it is assumed that a touch operation is performed on a sheet size key of the plurality of setting item keys K21 at the partner machine. In this case, the terminal control portion 110 on the own machine side instructs the terminal display portion 120 to display a setting value screen S3 for setting a sheet size as the setting screen S.

Next, a selection operation in the screen sharing mode is described specifically. Hereinafter, a case, where the short-cut key and program key of the plurality of function keys K11 are selected as the non-permission keys K11 on the home screen S1, is descried as an example.

For example, the terminal touch panel portion 130 accepts an operation (hereinafter, called a first operation), which moves a touch position to draw a frame, as a selection operation. And, when the first operation is performed, the terminal touch panel portion 130 accepts information indicating that the function key K11, which is one of the plurality of function keys K11 and outside the frame, is used as the non-permission key K11. If such first operation is defined as a selection operation, it is possible to easily perform the selection of the non-permission key K11.

Figure 9:
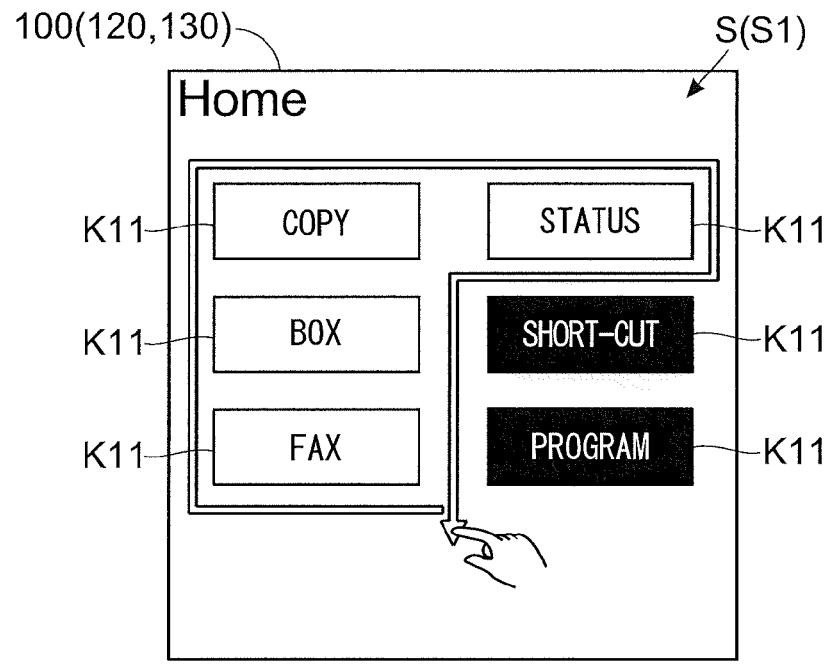
FIG. 9 is a view for describing an example of a selection operation (first operation) which a mobile information terminal according to an embodiment of the present disclosure accepts during a screen sharing mode time.
Figure 10:
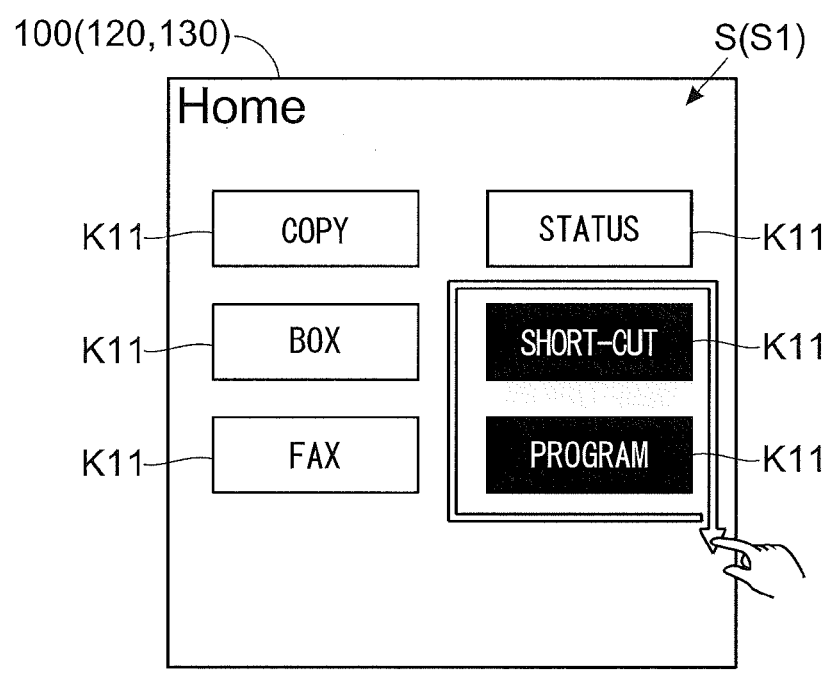
FIG. 10 is a view for describing an example of a selection operation (first operation) which a mobile information terminal according to an embodiment of the present disclosure accepts during a screen sharing mode time.

Specifically, in a case where the non-permission keys K11 (the short-cut key and the program key) are selected by mean of the first operation, as shown in FIG. 9, the touch position is moved in such a manner that a movement locus (shown by an outline arrow) of the touch position becomes a frame to enclose the function keys K11 other than the keys selected as the non-permission keys K11. In the meantime, as shown in FIG. 10, keys inside a frame (movement locus of the touch position) may be accepted as the no-permission keys K11.

Besides, in another example, the terminal touch panel portion 130 accepts an operation (hereinafter, called a second operation), which moves the touch position to outside a predetermined region without removing the touch on any one key of the plurality of function keys K11, as a selection operation. For example, the predetermined region is a region that is predetermined as a disposition region for the plurality of function keys K11. And, when the second operation is performed, the terminal touch panel portion 130 accepts information indicating that the function key K11, which is one of the plurality of function keys K11 and targeted for the second operation, is used as the non-permission key K11. If such second operation is defined as a selection operation, it is possible to easily perform the selection of the non-permission key K11.

Figure 11:
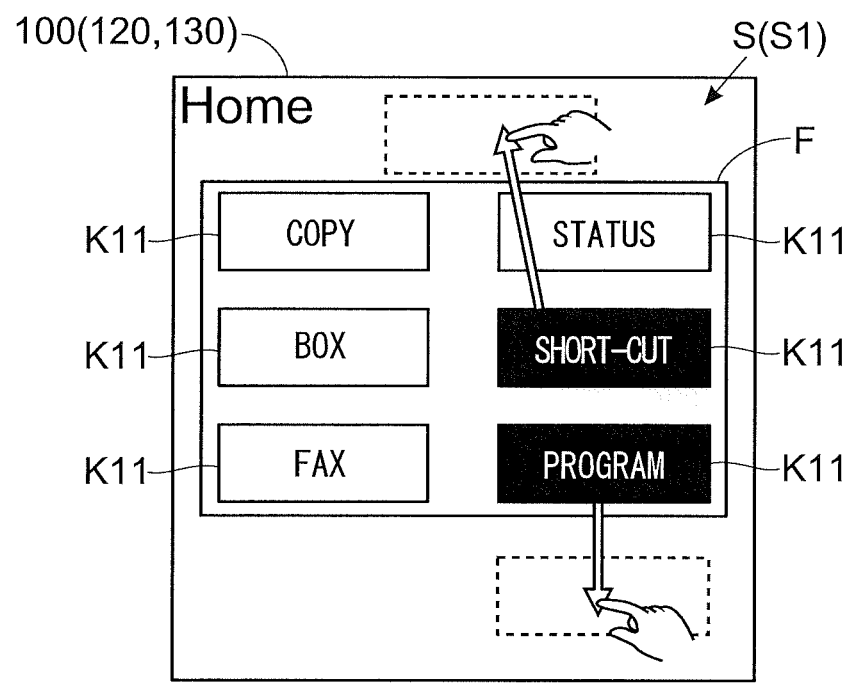
FIG. 11 is a view for describing an example of a selection operation (second operation) which a mobile information terminal according to an embodiment of the present disclosure accepts during a screen sharing mode time.

Specifically, In a case where the non-permission keys K11 is selected by mean of the second operation, as shown in FIG. 11, a key to be selected as the non-permission key K11 is touched, and the touch position is moved to outside the predetermined region. Besides, when selecting a plurality of non-permission keys K11, the second operation is performed continuously.

In the meantime, the terminal touch panel portion 130 may accept both the first operation and the second operation as selection operations. Or, only one of the first operation and the second operation may be defined as a selection operation. Besides, an operation different from the first operation and second operation may be defined as a selection operation. For example, a long-time pushing operation on a key to be selected as the non-permission key K11 may be defined as a selection operation.

As described above, the mobile information terminal 100 (display input apparatus) according to the present embodiment includes: the terminal display portion 120 (display portion) that displays the setting screen S which disposes the plurality of software keys (images) for accepting a setting operation; the terminal touch panel portion 130 that accepts the setting operation on the setting screen S and when accepting the setting operation, accepts a selection operation as well for selecting a non-permission key (non-permission image) that is an image not permitted to be displayed on a partner machine which is a communication destination; and the terminal communication portion 140 that transmits screen data for forcing the partner machine to display a screen, in which the non-permission key is removed from the setting screen S, as the sharing screen SS and forces the partner machine to display the sharing screen SS.

In the structure of the present embodiment, when accepting the setting operation on the setting screen S (screen that disposes the plurality of software keys), the terminal touch panel portion 130 accepts the selection operation as well for selecting the non-permission key, which is a key not permitted to be displayed on the partner machine that is the communication destination, from the plurality of software keys. In this way, when performing the setting operation on the setting screen S, it is possible to arbitrarily select the non-permission key. Accordingly, the convenience for the user improves. Besides, in this structure, the non-permission key is selected by accepting the selection operation; accordingly, the work of deciding whether the display is permitted to be displayed on the partner machine or not for every software key becomes unnecessary.

Besides, in the present embodiment, as described above, when the terminal communication portion 140 receives the operation data which are data transmitted from the partner machine when a touch operation is performed on the sharing screen SS at the partner machine and data indicating content of the operation on the sharing screen SS of the partner machine, the terminal display portion 120 performs a display switchover from the setting screen S in current display to a screen to be displayed in the case where an operation identical to the touch operation on the sharing screen SS of the partner machine is performed on the setting screen S. In this way, even if it is unknown what kind of touch operation should be performed on the setting screen S in current display, it is possible to ask the partner machine user to show an operation procedure.

Besides, in the present embodiment, as described above, the screen data (data for forcing the partner machine to display the sharing screen SS) do not contain the data for displaying the downward layer screen of the setting screen S displayed on the terminal display portion 120 at the time of accepting the selection operation. In this way, even if a touch operation is performed on the sharing screen SS at the partner machine, the display screen of the partner machine is held at the sharing screen SS. Accordingly, in the case where there is a software key in the downward layer screen of the setting screen S that should not be seen or operated by the partner machine, it is possible to prevent the software key from being seen or operated by the partner machine user.

It should be considered that the embodiment disclosed this time is an example in all respects and is not limiting. The scope of the present disclosure is not indicated by the above description of the embodiment but by the claims, further, all modifications within the scope of the claims and the meaning equivalent to the claims are covered.

What is claimed is:

1. A display input system comprising:
   a display input apparatus and a partner machine that is a communication destination for the display input apparatus,
   wherein the display input apparatus comprises
   a display portion that displays a setting screen which disposes a plurality of software keys for accepting a setting operation,
   a touch panel portion that accepts the setting operation on the setting screen and when accepting the setting operation, accepts a selection operation as well for selecting a non-permission key from the plurality of software keys that is a software key not permitted to be displayed on the partner machine, and
   a communication portion that transmits screen data for forcing the partner machine to display a screen to the partner machine, in which the non-permission key is removed from the setting screen and in which a permission key that is a software key other than the non-permission key out of the plurality of software keys is disposed, as a sharing screen and forces the partner machine to display the sharing screen,
   wherein, when the communication portion receives operation data that are data transmitted from the partner machine when an operation in which the permission key disposed on the sharing screen is touched is performed at the partner machine and data that indicate content of the operation performed on the sharing screen of the partner machine, the display portion:
   performs a display switchover from the setting screen in a current display to a screen located on one more downward layer than the setting screen in the current display, and displays, as a screen after the display switchover, a screen to be displayed in a case where, out of the plurality of software keys disposed in the setting screen in the current display, a same software key is touched as the permission key that was touched in the operation that was performed on the sharing screen at the partner machine, and
   wherein
   when the partner machine receives the screen data from the display input apparatus, the partner machine displays the sharing screen, and when an operation in which the permission key disposed on the sharing screen is touched is performed, the partner machine transmits the operation data to the display input apparatus, and
   when the operation in which the permission key disposed on the sharing screen is touched is performed, the partner machine does not perform the display switchover from the sharing screen in the current display but continues displaying the sharing screen in the current display.

2. The display input system according to claim 1, wherein the screen data do not include data for displaying a downward layer screen of the setting screen which the display portion displays at a time of accepting the selection operation.

3. The display input system according to claim 1, wherein the touch panel portion accepts a first operation, which moves a touch position to draw a frame, as the selection operation, and when the first operation is performed, accepts information indicating that of the plurality of software keys, a software key outside the frame or a software key inside the frame is used as the non-permission key.

4. The display input system according to claim 1, wherein the touch panel portion accepts a second operation, which moves a position of a touch to outside a predetermined region without removing the touch on a software key of the plurality of software keys, as the selection operation, and when the second operation is performed, accepts information indicating that a software key, which is one of the plurality of software keys and targeted for the second operation, is used as the non-permission key.

5. The display input system according to claim 1, wherein the setting screen is a screen for accepting setting of an image forming apparatus, and the communication portion transmits setting data, which indicate content set on the setting screen, to the image forming apparatus.

6. The display input system according to claim 1, wherein when the non-permission key is selected, the display portion changes a display form of the non-permission key.

7. A method for controlling a display input apparatus comprising:
- a step for displaying a setting screen which disposes a plurality of software keys for accepting a setting operation,
- a step for accepting the setting operation on the setting screen and when accepting the setting operation, accepting a selection operation as well for selecting a non-permission key from the plurality of software keys that is a software key not permitted to be displayed on a partner machine which is a communication destination, and
- a step for transmitting screen data for forcing the partner machine to display a screen to the partner machine, in which the non-permission key is removed from the setting screen, as a sharing screen and forcing the partner machine to display the sharing screen and in which a permission key that is a software key other than the non-permission key out of the plurality of software keys is disposed, and
- on receiving operation data that are data transmitted from the partner machine when an operation in which the permission key disposed on the sharing screen is touched is performed at the partner machine and data that indicate content of the operation performed on the sharing screen of the partner machine,
- performing a display switchover from the setting screen in a current display to a screen located on one more downward layer than the setting screen in the current display, and
- displaying, as a screen after the display switchover, a screen to be displayed in a case where, out of the plurality of software keys disposed in the setting screen in the current display, a same software key is touched as the permission key that was touched in the operation that was performed on the sharing screen at the partner machine wherein when the partner machine receives the screen data from the display input apparatus, the partner machine displays the sharing screen, and when an operation in which the permission key disposed on the sharing screen is touched is performed, the partner machine transmits the operation data to the display input apparatus, and
- when the operation in which the permission key disposed on the sharing screen is touched is performed, the partner machine does not perform the display switchover from the sharing screen in the current display but continues displaying the sharing screen in the current display.

* * * * *